Feb. 23, 1965 W. W. JETTER 3,171,092
ADJUSTABLE CONSTANT-CURRENT WELDING TRANSFORMER
Filed Aug. 26, 1958 3 Sheets-Sheet 1

INVENTOR.
WILLIAM W. JETTER
BY Kegan, Dellany & Kegan
ATTORNEYS

Feb. 23, 1965 W. W. JETTER 3,171,092
ADJUSTABLE CONSTANT-CURRENT WELDING TRANSFORMER
Filed Aug. 26, 1958 3 Sheets-Sheet 2

INVENTOR.
WILLIAM W. JETTER
BY
Kegan, Bellamy & Kegan
ATTORNEYS

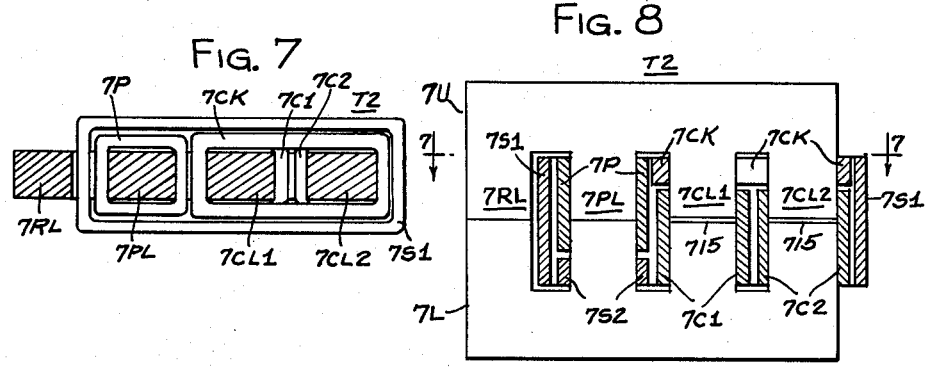
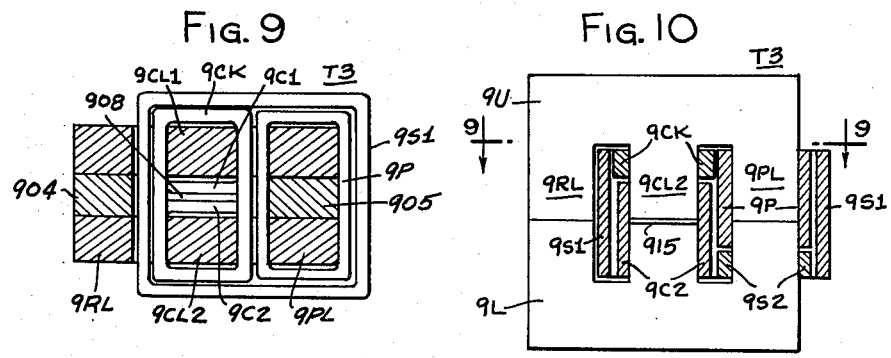
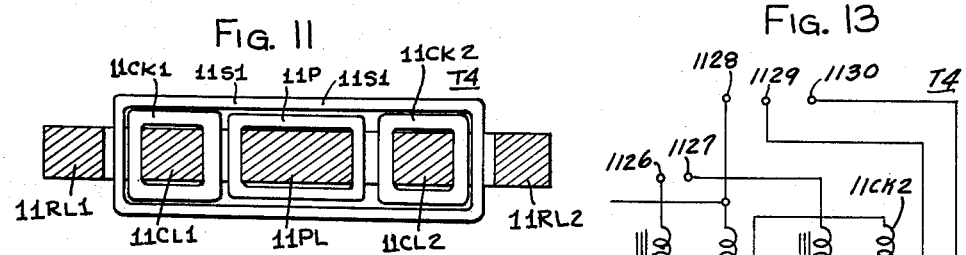
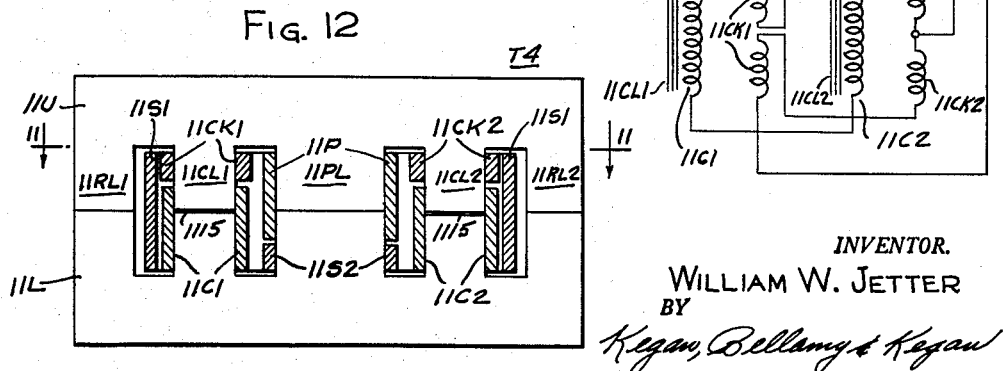

United States Patent Office 3,171,092
Patented Feb. 23, 1965

3,171,092
ADJUSTABLE CONSTANT-CURRENT WELDING TRANSFORMER
William W. Jetter, Riverside, Ill., assignor to Mid-States Welder Manufacturing Co., a corporation of Illinois
Filed Aug. 26, 1958, Ser. No. 757,238
10 Claims. (Cl. 336—155)

My invention relates to welding transformers and systems, being concerned more particularly with a welding system wherein the welding transformer is adjustable to supply welding current of any desired maximum value within a wide range, and limits the welding current to such maximum value by control action occurring within the transformer, as distinct from employing an external limiting resistor or reactor in series with the load.

The principal object of the invention is to provide a transformer which has a desired fixed open-circuit output welding voltage and which is readily preadjustable from time to time to limit its output welding current to such maximum value as may be currently desired according to the items to be welded.

Referring particularly to arc welding, the leads extending from the secondary windings of the welding transformer are brought together through welding electrodes to draw current through an article to be welded, following which one electrode is withdrawn to strike an arc which is maintained during the welding operation, the heat of the arc causing welding to occur. The nature of an article to be welded dictates the amount of heat to be applied and consequently largely dictates the amount of current required or permissible to accomplish the welding operation efficiently and without injury to the welded article. Such articles may range from small and delicate parts admitting of only a small amount of heat, to large parts requiring a relatively large amount of heat. The current flow from the secondary windings of the transformer must thus be adjustable over a wide range, but the open-circuit voltage must remain generally fixed, at a value at least sufficient to maintain the welding arc.

Early in the art of arc welding, a welding transformer was provided capable of supplying the heaviest current and having the desired open-circuit voltage for initiating and maintaining the welding arc, and an adjustable series resistance, or a reactance, external to the transformer was employed to limit the current flow according to the nature and requirements of the article or parts being welded. Subsequently, in order to lower the overall cost of the welding apparatus, as well as its weight and bulk, and to largely eliminate the power loss and heat dissipation in the series adjustable resistor or reactor, welding transformers have been produced of the adjustable constant-current type, but they have for the most part required the physical adjustment of air gaps in the control paths within the transformer, the physical requirements of which have caused them to be somewhat expensive, bulky, and difficult of adjustment. Prior examples of transformers of this type are disclosed in Patents 2,411,370 and 2,437,021.

More recently, as in Patent 2,591,582, a modification of the transformer arrangement disclosed in the noted patents has been proposed wherein the reluctance of the shunt or control arms of the transformer has been adjusted by the passage of a desired amount of direct current through associated control windings in an attempt to provide a structure rendering unnecessary the physical adjustment of air gaps in the control or shunt arms of the transformer. For the most part, such proposals have been open to the objection that the resulting transformer structure is inefficient, that the transformer operation is seriously hampered by undesired intercoupling between the alternating-current and direct-current portions of the circuit path, and that only a small useful control range is obtained.

According to the invention, the foregoing disadvantages are overcome by providing a welding system employing a welding transformer which employs a number of interconnected core legs comprising at least one primary leg and at least one pair of control legs, with a secondary winding which encircles the primary leg and both control legs, together with separate direct-current energizable windings on the control legs. Further according to the invention, the control windings are so interconnected, in opposing relationship, within the direct-current control circuit that the alternating potential induced by flux passing through either such winding is neutralized within the control circuit by the equal and opposite potential induced by the simultaneous passage of alternating flux in the opposite direction through the other control winding, and the core portions of the transformer structure are so interrelated and arranged that the direct-current control flux generated in the control legs by the direct current through the control windings is substantially entirely excluded from the primary leg of the transformer, to thus substantially entirely eliminate any tendency toward saturation of the primary leg.

Still further according to the invention, the controlling effect exercised by the adjusted value of the direct current flowing through the control windings is greatly increased in effect by surrounding the control legs of the transformer with a choke coil, the choking effect of which is also adjustable according to the value of the flow of current through the direct-current control windings. By providing a transfer switch which selectively includes none, part, or all of the noted choke coil in series with the welding load, a number of adjustable ranges are provided in welding current, which permits any desired value of welding current from extremely small to very large to be taken from the same welding transformer. The above mentioned and other objects and features of this invention and the manner of obtaining them will become more apparent, and the invention itself will be better understood, by reference to the following description of an embodiment of the invention taken in conjunction with the accompanying drawings comprising FIGS. 1 to 13, wherein:

FIG. 1 discloses a top view of a welding transformer T1 suitable for use in the improved welding system;

FIGS. 7 and 8 show the invention applied to a four-legged transformer T2 having a single primary winding;

FIGS. 9 and 10 show transformer T3, a first modification of the structure of T2 to provide a shorter but thicker structure;

FIGS. 11 and 12 show transformer T4, a second modification of the structure of T2; and FIG. 13 is a partial circuit diagram of T4 in a welding system, showing the two choke windings of T4 connected to act together.

FIGS. 1 to 4.—Transformer T1

Figure 1:
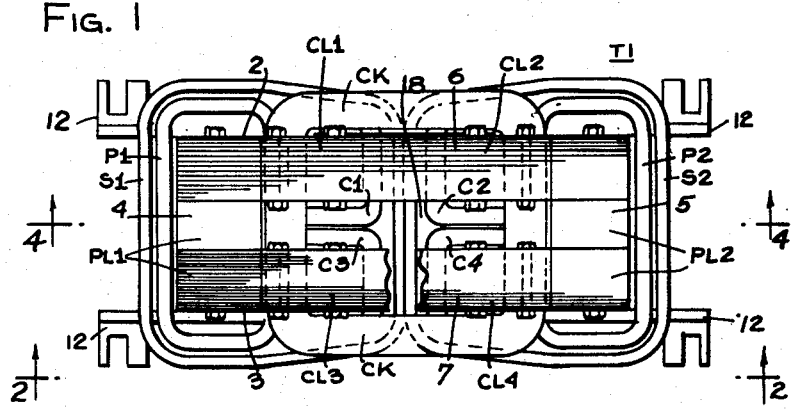

Referring to FIGS. 1 to 4, the preferred form, T1, of the transformer construction illustrated therein comprises a closed-circuit laminated-core structure provided with the illustrated windings. The core structure is supported on the four foot strips 12 and is preferably arranged for a forced draft of air to be passed through the open parts of the structure for cooling purposes, particularly when heavy welding currents are being drawn.

Transformer T1 comprises similar upright primary legs PL1 and PL2 at the ends of the core structure, the ends of which legs are magnetically joined by the illustrated upper pair and lower pair of horizontal magnetic return bars, between which are a rear pair of upright control legs CL1 and CL2, and a front pair of upright control legs CL3 and CL4. The laminated core structure of T1 is divided into a rear portion 2, 6 and a front portion 3, 7 by upright laminated spacing structures 4 and 5, which provide a central shaft-like space 18 (FIGS. 1 and 3) to provide room for the control windings around the four control legs CL1 to CL4 and also to provide a ventilating space for cooling air to be passed through the core structure.

Three sides of the ladder-like front portion 2, 7 of the laminated structure are made up of a stack 3 of similar laminations which comprises the front portion of the upright primary legs PL1 and PL2, and the lower half of the control legs CL1 and CL2. The top side of the front portion is the laminated structure 7, which comprises the front horizontal upper connecting leg between PL1 and PL2, together with the upper half of the front control legs CL3 and CL4. Similarly, the ladder-like rear portion of the laminated structure comprises assemblies 2 and 6 which are respectively similar to front assemblies 3 and 7.

In assembling the structure of FIGS. 1 to 4, the base structure may first be assembled. It comprises the laminated assemblies 2, 3, 4, and 5, bolted together without core structures 6 and 7. Through bolts 8 and relatively short bolts 10 are employed to secure assemblies 2 to 5 with each other and with foot strips 12. Through bolts 9, having thin heads and thin attaching nuts, are employed at the center portion of legs PL1 and PL2. The two upper bolts 8 may be omitted until the coils have been assembled with the structure.

The illustrated power coils may next be assembled with the noted base structure comprising local secondary coil S3, on the left primary leg PL1; primary coils P1 and P2, which closely surround the respective primary legs PL1 and PL2; and secondary coils S1 and S2, each of which surrounds a separate primary leg and the two adjacent control legs.

The four control windings C1 to C4 may next be assembled with the lower portion of the control legs CL1 to CL4, carried on the base structure, each such control winding rather closely surrounding its associated control leg but being outwardly spaced front and rear sufficiently to pass over the short bolts 11, which are provided with relatively thin heads and nuts for that purpose.

Choke winding CK may now be placed on top of the other windings, in position to be in encircling relationship with all four of the control legs CL1 to CL4 when assembly of the structure is completed.

Laminated structures 6 and 7, each of which preferably has the same lamination thickness as do assemblies 2 and 3, are held together by bolts 11 within legs CL1 and CL2 (provided with thin bolt heads and nuts), and by bolts 10 within the top horizontal portion of each structure. Each of the assembled structures 6 and 7 may next be lowered into place from the top. Their dimensions are such that a relatively close fit results, and the parts may be brought down into final assembled position by the use of a mallet. The resulting structure provides a very close magnetic union with the inner face of the upper end of legs PL1 and PL2. Preferably, however, a slight air gap, as of perhaps .010 inch, is provided at each of the four central locations 15 in legs CL1 to CL4. These air gaps may be insured by placing a non-magnetic spacer, as of a hard plastic sheet of desired thickness, at each of the gap locations 15.

In FIGS. 1 to 4, the winding leads representing the terminals of the illustrated windings have been omitted to avoid obscuring the other parts of the drawing, and no terminals for these leads and for interconnecting them with external circuit conductors have been illustrated, since such terminals and leads may be provided in any well-known or desired manner.

Figure 5:
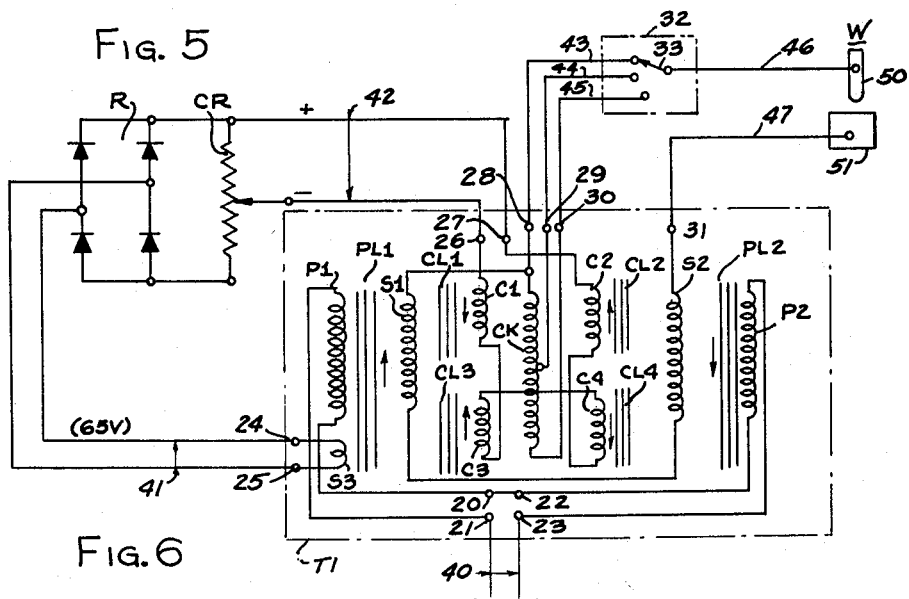
FIG. 5 shows in circuit diagram a welding system incorporating transformer T1 of FIGS. 1 to 4.

FIG. 5.—The welding system

FIG. 5 shows in circuit diagram a preferred form of welding system employing the transformer T1 of FIGS. 1 to 4, which is indicated in FIG. 5 by the apparatus within the broken-line rectangle T1. Terminals 20 to 31 are shown for T1 through which the windings are connected with each other and with the illustrated external circuit conductors.

Figure 4:
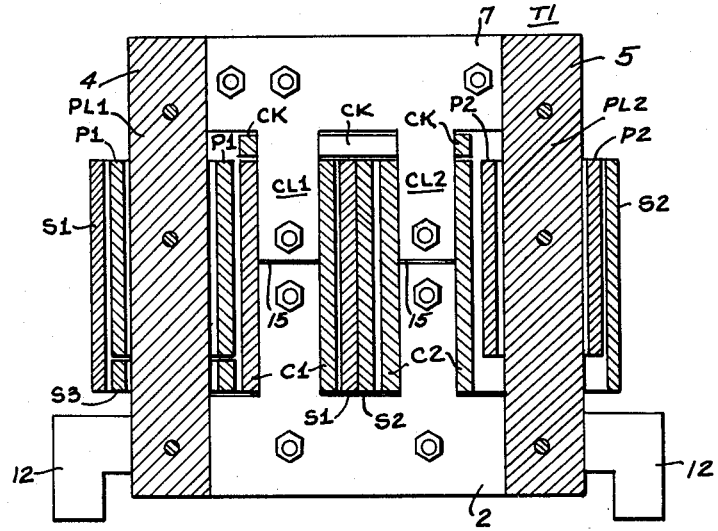
FIG. 4 is a front sectional view of T1 taken generally along line 4—4 of FIG. 1, but also showing in section the windings C1 and C2 lying to the rear of the section plane.

In FIG. 5, the two primary windings P1 and P2 of FIGS. 1 and 4 are shown interconnected in series with each other and supplied with current over conductors 40 from a 440-volt 60-cycle current source. The connections at terminals 20 to 23 may be changed from series to parallel in the usual manner for 220-volt excitation over conductors 40. Windings P1 and P2 are shown adjacent the conventional showing of primary legs PL1 and PL2 as an indication of the encircling relationship therewith. Secondary windings S1 and S2 are shown connected in series with each other between terminals 28 and 31 to provide a combined output voltage equal to twice the voltage of either winding. Winding S1 is shown in FIG. 5 between primary leg PL1 and the control legs CL1 and CL3 as an indication of the inductive relationship shown in FIGS. 1 to 4 wherein winding S1 encircles all three of the legs PL1, CL1, and CL3. Winding S2 is similarly shown with respect to legs PL2, CL2, and CL4 since it encircles these three legs. Control windings C1 to C4 are shown respectively adjacent the indications of control legs CL1 to CL4, as an indication that each such control winding encircles only its own locally associated control leg. Choke winding CK is shown similarly related to each of the control legs CL1 to CL4 since CK encircles all four of the control legs, as shown in FIGS. 1 to 4. Secondary winding S3 is shown below winding P1 in FIG. 5 since it also surrounds only primary leg PL1.

High range—40 to 500 amperes

As shown in FIG. 5, the respective conductors 40 are connected through 21, 23 to the upper terminals of windings P1, and the lower terminals of these windings are connected together through 20, 22, which causes windings P1 and P2 to be energized in opposing relationship. That is, during one half cycle of current from conductors 40, flux is thus induced upwardly in PL1 and downwardly in PL2, with the opposite condition obtaining during the next succeeding half cycle. Primary-induced flux in legs PL1 and PL2 is thus serially linked through these two legs and the horizontal connecting portions of the core structure. The legs PL1 and PL2 are thus in series-aiding flux relationship, wherefore there is no particular tendency for alternating flux to flow through control legs CL1 to CL4 in the absence of current through the secondary windings S1 and S2. The magnetic neutral point of the structure from the standpoint of flux resulting from primary excitation is at about the central portion of the upper and lower horizontal connecting legs, between the left control legs CL1, CL3 and the right control legs CL2, CL4. Consequently, with no welding current being drawn, the magnetic linkage between the primary and secondary windings (from P1 to S1 and from P2 to S2) is substantially the same as though each secondary winding encircled only the primary leg encircled by its associated primary winding.

The lower terminals of the secondary windings S1 and S2 are joined together, and the upper terminals of these windings are brought out (at terminals 28 and at 31) to furnish current over conductors 46 and 47 to the welder W, illustrated as a lower electrode 51 and an upper electrode 50. Electrode 50 is the movable electrode, and it commonly contains such welding-flux material as may be needed to enhance the welding operation.

Range switch 32 is provided to connect conductor 46 with any desired one of the three output conductors 43 to 45. With range switch 32 in its illustrated position (connecting conductor 46, through switch member 33, with conductor 43), the welding system is set for the highest range of welding currents, up to 500 amperes, for example. The low point in this range is with the controller CR set with its arm in uppermost position, to supply substantially zero current to control windings C1 to C4. Under that condition, the control windings offer no retardation to the free passage of alternating current flux through control legs CL1 to CL4. Then, when the welding circuit is closed, over conductors 43, 46, and by way of electrodes 50 and 51 and return conductor 47, the resulting starting current flowing in the welding circuit, from secondary windings S1 and S2 in series, causes a large portion of the primary-induced flux in each of the legs PL1 and PL2 to return through its associated control legs rather than returning in series with the other primary leg. For example, considering a half cycle when the primary flux is upwardly in leg PL1 as indicated by the arrow thereat in FIG. 5 (and is then downwardly in leg PL2), the effect of the resulting induced current in secondary winding S1 is to tend to pass flux downwardly through the legs PL1, CL1, and CL3 encircled by winding S1. This effect is overcome in leg PL1 by the current flowing through primary winding P1, but the effect is manifest in control legs CL1 and CL3 by causing flux to flow downwardly in both of these control legs, thus bypassing a corresponding amount of the flux induced by P1 in PL1 from traversing PL2. At the same time, the indicated downward flux in primary leg PL2 is accompanied by the flow of the welding current in secondary winding S2 (in series with S1) in such a direction as to tend to cause flux to pass upwardly through the legs PL2, CL2, and CL4 encircled by secondary winding S2. Primary winding P2 nullifies the noted effect in leg PL2, but substantial flux flows upwardly through CL2 and CL4 to bypass the normal return path, through PL1, of flux from PL2.

It will be understood, of course, that the described action of welding current through S1 in producing downward flux through control legs CL1 and CL3 is equaled by the described action of the equal welding current through winding S2 in producing upward flux through legs CL2 and CL4.

In the illustrated structure and system, with no current through control windings C1 to C4, the noted by-passing action through CL1 and CL3 for flux from PL1, and through CL2 and CL4 for flux from PL2, limits the maximum welding current flow over conductors 46 and 47 to perhaps 40 amperes, the low point in the noted illustrated high-range setting of switch 32.

As shown in FIG. 5, the secondary winding S3, on leg PL1, supplies current through terminals 24 and 25, at about 65 volts, through full-wave rectifiers R to provide a potential of about 65 volts D.C. across controller CR. The upper terminal of controller CR is connected by way of the positive one of the two conductors 42 to terminal 27 of T1, while the slider of controller CR is connected by way of the negative one of the conductors 42 to termial 26 of T1. Terminals 26 and 27 are connected together in T1 through windings C2, C4, C3, and C1 in series. These windings are so interconnected directionally, as shown, that direct-current flux is induced in opposite directions in legs CL1 and CL3, such flux agreeing respectively in CL4 and CL2 with its directions in CL1 and CL3. Specifically, the direction of direct-current flux, with the illustrated polarity, is down in the diagonally opposed legs CL1 and CL4, and is up in the other diagonally opposed legs CL2 and CL3.

The amount of the induced direct-current flux is controlled by the amount of direct current passing through the control windings over conductors 42, which is controlled in turn by the position of the slide arm of controller CR. The current is obviously at its low point when the controller slide arm is in its uppermost position, and is at its high point when the slide arm is in its lowermost position. The current flow through the windings C1 to C4 may range from zero to about 10 amperes, for example, according to the position of the slide arm of CR.

Figure 2:
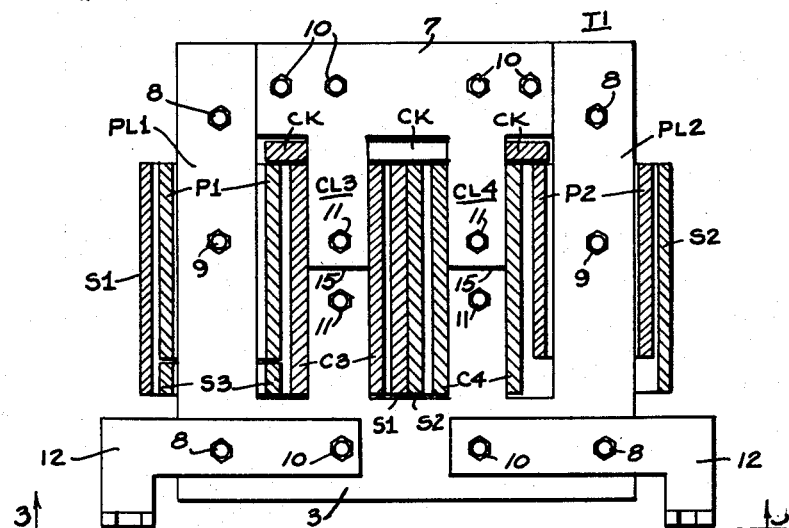
FIG. 2 is a front view of T1 along line 2—2 of FIG. 1, with the windings shown in section.
Figure 3:
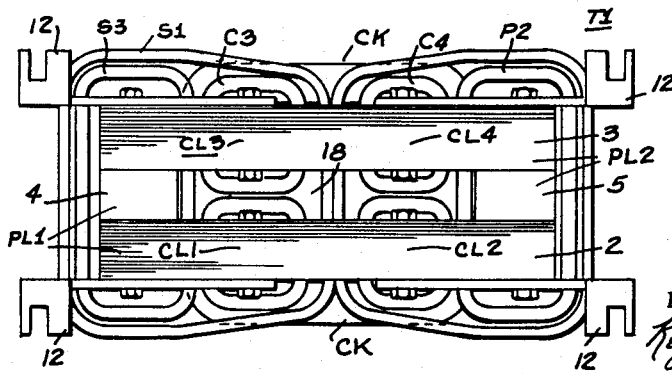
FIG. 3 is a bottom view of T1 along line 3—3 of FIG. 2.

The cross-sectional area of the control legs is somewhat less than the cross-sectional area of the primary legs and of the horizontal interconnecting portions of the transformer core. Accordingly, even when no control current is flowing through coils C1 to C4 when the welding circuit of FIG. 5 is closed (as over conductors 43, 46, and 47, upon closure together of electrodes 50 and 51) there is a substantial reluctance within the control legs in addition to the reluctance effect of air gaps 15 therein (FIGS. 2 and 4). This combined control-leg reluctance limits the amount of the primary-induced flux diverted through the control legs, even with no control current flowing through coils C1 and C4, thereby establishing the noted low point of the high range, at about 40 amperes.

As current is admitted to the control windings C1 to C4, by moving the noted slider of controller CR downwardly from its uppermost position, the indicated direct-current flux induced in control legs CL1 to CL4 by coils C1 to C4 tends to saturate control legs CL1 to CL4 and to thus effectively increase the reluctance of each. The ability of the control legs to carry by-passing, or leakage, primary-induced flux which returns within the secondary windings S1 and S2 is thus lowered a corresponding amount, thereby increasing the amount of flux which continues to pass serially through the two primary legs PL1 and PL2, and in inducing relationship to the secondary windings. The maximum welding current which can then be passed through the electrodes by way of conductors 43, 46, and 47 is thus increased according to the amount of current through conductors 42 to the control windings of T1. The maximum welding current in the high range may be about 500 amperes when the slide arm of the controller CR is in its lowermost position, wherein maximum current passes through the control windings.

The reluctance produced by non-magnetic gaps 15 in legs CL1 to CL4, in addition to aiding as described in limiting the by-pass, or leakage, alternating flux to establish the low point of the high range, is also useful in combating residual tendency of the magnetic material to retain substantial direct-current flux when the control current over 42 is lowered by moving CR to reduce the current flow from a given point to a lower point within a selected range.

Referring to the rear control legs CL1 and CL2, it will be observed that the direct-current control flux through these two legs is up in one leg and down in the other, in series-aiding relationship. As a result, this direct-current flux is caused to circulate locally through the associated rear horizontal connecting portions of the core structure, and thus has almost no tendency to pass through, or saturate, either of the primary legs PL1 and PL2. Similarly, the flux through the front control legs CL3 and CL4 is up in one control leg and down in the other, in series-aiding relationship, similarly substantially confining the direct-current flux from these front control windings to the local portion of the core structure, which excludes the primary legs PL1 and PL2. For these reasons, the noted provision of four direct-current excited control legs for the illustrated structure of transformer T1, with its two primary legs PL1 and PL2, prevents the saturating effect of the direct current in the control windings from reaching the primary legs.

The alternating-current flux diverted through the control legs as described is also prevented from having an adverse effect on the direct-current control circuit by the illustrated connections of the control windings. Considering, for example, the left-hand control legs CL1 and CL3, through which flux emanating from PL1 is diverted from returning by way of PL2, that flux passes in the same direction (either up or down) through both of the legs CL1 and CL3 at the same time. The voltage which is induced in the direct-current control path in either direction through winding C1 is neutralized by an equal and opposite voltage induced in such path through winding C3. Similarly, flux diverted by current in secondary winding S2, to pass through control legs CL2 and CL4 instead of returning through primary winding PL1, induces a given voltage in winding C2 while at the same time inducing an equal and opposite voltage in winding C4 from the standpoint of the direct-current path.

From the foregoing, it will be observed that the direct-current and alternating-current circuits are maintained substantially conjugate with respect to each other in that the flow of alternating current through the primary and secondary windings has substantially no effect on the flow of direct current through the control windings, and the flux induced by the flow of current through the control windings is substantially prevented from traversing the legs of the transformer encircled by primary windings P1 and P2.

It may be noted that a series-parallel connection of windings C1 to C4 to conductors 42 may be substituted for the illustrated full series connection with no adverse effect, so long as the relative directions of control current through the windings C1 to C4 remains unchanged. For example, one branch path across conductors 42 may comprise windings C1 and C3 reversely connected in series, with a parallel path across conductors 42 including windings C2 and C4 oppositely connected in series and poled as described relative to C1 and C2. Alternatively, one of the two parallel branches could include windings C1 and C4 connected in series in the same sense (rather than oppositely), so long as the other branch includes coils C2 and C3 connected in series and poled in the opposite sense with respect to C1 and C4. This latter arrangement is permissible because the diverted-flux direction through legs CL1 and CL3 is opposite to the diverted-flux direction through CL2 and CL3.

A simple parallel connection is not recommended. For example, if all four windings C1 to C4 were connected in parallel across conductors 42, they would still need to be relatively poled as indicated. In that event, no substantial alternating current would thereby be reflected back over direct-current wires 42, since circulating alternating current from C1 and C4 in parallel would then return through C2 and C3 in parallel. Windings C1 to C4 would thus each tend to act as a shading coil around its associated control leg, to thus retard and greatly diminish the described flux-diverting action through legs CL1 to CL4.

*Intermediate range—20 to 100 amperes*

When welding current of an intermediate range, as from 20 to 100 amperes, is desired, arm 33 of range switch 32 is rotated from the terminal of wire 43 to the terminal of wire 44, thereby including the upper section of choke coil CK in series between the upper terminal of secondary winding S1 and conductor 46. The inductive action of the included section of winding CK thus reduces the maximum current which can be obtained over conductors 46 and 47, when the electrodes 50 and 51 are in contact, to about 20 amperes for minimum control current and to about 100 amperes for maximum control current over conductors 42. For example, with range switch 32 in its noted intermediate position, and with the slide arm of CR at its uppermost position (for substantially zero current over conductors 42), there is the noted maximum ability of control legs CL1 to CL4 to respond to current flow in the secondary windings by diverting flux from its normal path through PL1 and PL2 in series to a return path through CL1 and CL3 in parallel for PL1 and a separate return path through CL2 and CL4 for PL2. At the same time, with no substantial direct-current flux in legs CL1 to CL4, all four of which are encircled by coil CK as shown in FIGS. 1 to 4, CK has a maximum choking effect because of the relatively low-reluctance path provided through CK by the four legs CL1 to CL4 in parallel. The return path for the choke-induced flux in these control legs is through PL1 and PL2 in parallel.

When the slide arm of CR is progressively lowered toward its position of highest current over conductors 42, the resulting progressive increase in the direct-current flux induced in legs CL1 to CL4 causes the described progressive increase in the effective reluctance of the control legs. Such reluctance increase increases the maximum flow of welding current in two ways. First it correspondingly reduces the capacity of the control legs to divert flux as described in response to the flow of welding current. Second, it correspondingly reduces the choking inductance of the portion of coil CK which is included in the welding circuit. These two additive effects act jointly in controlling the output of current from the welding transformer over the intermediate range of 20 to 100 amperes.

*Low range—3 to 25 amperes*

When welding current of a low range, as from 3 to 25 amperes, is required, arm 33 of range switch 32 is rotated to its lower position, wherein it joins output conductor 45 to conductor 46, thereby including both sections of choke winding CK in series between the upper terminal of secondary winding S1 and conductor 46. In this position of range switch 32, and with the slide arm of controller CR in its uppermost position to supply minimum current over conductors 42, the full choking effect of all turns of coil CK cooperates with the full diverting effect of legs CL1 to CL4 to reduce the maximum output current to its lowest point, 3 amperes for example, thus adapting the welder for welding small and delicate parts without injury. In this low range, as the slide arm of controller CR is progressively lowered, to thereby supply progressively increased control current over conductors 42, the resulting increased saturation of control legs CL1 to CL4 causes less flux to be diverted through these control legs to thereby cause the output to be increased, at the same time reducing the choking effect of coil CK as described. These two conjointly acting effects culminate in a top value (about 25 amperes) of maximum welding current for the low range being reached when maximum direct current is caused to flow over conductors 42 when the arm of CR is in its lowermost position.

Figure 6:
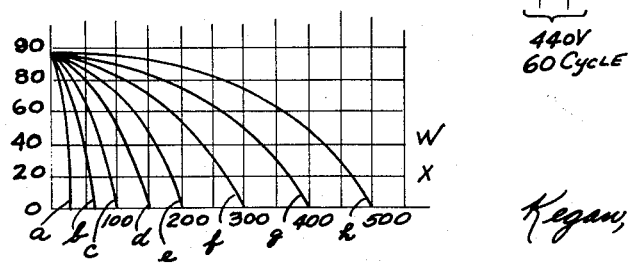
FIG. 6 shows in graphic form the voltage-current relationships of the welding-current output of the system including the transformer of FIGS. 1 to 4 for various adjustments $a$ to $h$ over a current range from a few amperes to 500 amperes.

*FIG. 6—Graphic illustration*

Referring to FIG. 6, the general relationship between output current and the voltage across electrodes 50 and 51 is indicated by separate curves *a* to *h*. The values along the vertical axis indicate voltage, while the values along the horizontal axis indicate amperage. The two horizontal lines W and X, at about 40 and 20 volts respectively, indicate the usual maximum and minimum arc voltages maintained across the electrodes 50 and 51 during welding. The horizontal zero line indicates the voltage between the electrodes when they are brought into mutual contact preparatory to separation to start the welding arc. Curve *a* represents the voltage-versus-current characteristics of the output circuit at a selected point at about the top of the described low range; curves *b* and *c* fall within the described intermediate range; and curves $d$ to $h$ fall within the described high range of welding current.

From the values given for the foregoing ranges, it will be observed that there is some overlap between any two adjacent ranges. As a result, curve $a$ may lie within the high part of the low range or the low part of the intermediate range; curve $b$ lies well within the intermediate range and at the low end of the high range; curve $c$ lies just at the top of the intermediate range and in the lower part of the high range; and curves $e$ to $h$ are all within the noted high range of the welding apparatus.

FIGS. 7 and 8—Transformer T2

Referring to FIGS. 7 and 8, they show transformer T2, which is the first of three modifications of transformer T1 of FIGS. 1 to 4. FIG. 7 is a top sectional view taken along line 7—7 of FIG. 8.

The core structure of T2 is illustrated as comprising upper section 7U and lower section 7L. When assembled as shown in FIG. 8, these two sections provide four vertical legs in a row, comprising primary leg 7PL, return leg 7RL for the primary flux, and control legs 7CL1 and 7CL2. Gaps 715 are preferably provided in control legs 7CL1 and 7CL2 for the purpose described for gaps 15 in T1 of FIGS. 1 to 4.

The windings of T2 comprise primary winding 7P and local secondary winding 7S2 encircling leg 7PL; secondary winding 7S1 encircling the three legs 7PL, 7CL1, and 7CL2; control windings 7C1 and 7C2 around control legs 7CL1 and 7CL2, respectively; and choke winding 7CK encircling legs 7CL1 and 7CL2.

Transformer T2 may be employed in the circuit of FIG. 5 in place of the transformer T1 by connecting primary winding 7P in place of the two windings P1 and P2; connecting secondary winding 7S1 in place of the two secondary windings S1 and S2; connecting secondary winding 7S2 in place of secondary winding S3; connecting winding 7CK in place of winding CK; and connecting windings 7C1 and 7C2 in place of the windings C1 to C4, the two windings 7C1 and 7C2 being oppositely connected in series in the direct-current path to provide an upwardly directed direct-current flux in one control leg and an equal downwardly directed direct-current flux in the other control leg. The described desired conjugate relationship between the direct-current and alternating-current circuit and flux paths then obtains as described in connection with FIGS. 1 to 5, and the regulatory action of control windings 7C1 and 7C2 and of choke winding 7CK over the output current in secondary winding 7S1 then occurs as described for the corresponding windings of transformer T1.

The structure of FIGS. 7 and 8 has the advantage that it requires fewer windings than the structure of FIGS. 1 to 4, but exhibits a lowered efficiency because of the longer path required through the unwound leg 7RL for the return of flux generated in the single primary leg 7PL, in contrast with the two series-aiding primary legs PL1 and PL2 of transformer T1.

It will be appreciated that, with substantially no current flowing through secondary winding 7S1, most of the flux generated in 7PL by primary winding 7P returns through leg 7RL. As welding current is permitted to flow in winding 7S1 a corresponding amount of the primary flux tends to be diverted equally through control legs 7CL1 and 7CL2, the amount diverted for any given strength of current in 7S1 depending upon the amount of control current flowing in coils 7C1 and 7C2. It will be understood further that the choking effect of winding 7CK, when included partially or wholly in the circuit of FIG. 5 according to the position of range switch 32, exhibits a choking effect which also varies according to the state of saturation or non-saturation imposed upon legs 7CL1 and 7CL2 by direct current through windings 7C1 and 7C2.

FIGS. 9 and 10—Transformer T3

Referring to FIGS. 9 and 10, the transformer T3 shown therein is a shorter but thicker form of a transformer having the general characteristics of transformer T2 of FIGS. 7 and 8. FIG. 9 is a top sectional view taken along line 9—9 of FIG. 10.

The core structure of T3 comprises an upper section 9U and a lower section 9L. These two sections provide primary leg 9PL at the right and return leg 9RL at the left for flux emanating from the primary leg. The core structure is divided vertically into front and rear sections by vertical spacers 904 and 905, to leave a shaft-like central opening 908 which corresponds generally to opening 18 of transformer T1. The rear portion of the core structure provides control leg 9CL1, and the front portion provides control leg 9CL2, each such leg having a small air gap 915 (FIG. 10) therein which coresponds to the air gap 715 of T2.

Leg 9PL is provided with primary and secondary windings 9P and 9S2 which correspond to windings 7P and 7S2 of T2; secondary winding 9S1 encircles the three legs 9PL and 9CL1, 9CL2, and thus corresponds to secondary winding 7S1; control windings 9C1 and 9C2 encircle control legs 9CL1 and 9CL2, respectively, and thus correspond to control windings 7C1 and 7C2; and choke winding 9CK encircles both of the legs 9CL1 and 9CL2, and thus corresponds to winding 7CK.

The windings of transformer T3 can be incorporated within the circuit of FIG. 5 as explained for transformer T2, and to substantially the same effect.

It will be observed that the control legs 9CL1 and 9CL2 of T3 are symmetrically related with respect to the associated primary leg, which arrangement appears to be more advantageous than the tandem relation of the legs 7CL1 and 7CL2 of T2 with respect to primary leg 7PL. In practice, however, the two structures appear to be substantially equivalent from an operational standpoint, and the primary advantage of T3 over T2 is its compactness resulting from its reduced horizontal length.

FIGS. 11 to 13—Transformer T4

Referring to FIGS. 11 and 12, the transformer T4 shown there is a comparatively long form of a single-primary transformer having the general characteristics of the previously described transformers, but being arranged entirely symmetrical about its vertical center line, through its primary leg 11PL, its control legs 11CL1 and 11CL2 being disposed next outwardly from the primary leg; and the two return legs 11RL1 and 11RL2 being located at the ends. The core structure may comprise two similar sections 11U and 11L each made without gaps in legs 11PL and 11RL1 and 11RL2 but with gaps 1115 in the control legs which correspond to gaps 15, 715, and 915 in transformers T1 to T3.

Primary and secondary windings 11P and 11S2, around leg 11PL, correspond to the primary and local secondary windings of T2 and T3; principal secondary winding 11S1 encircles legs 11PL, 11CL1, and 11CL2, and corresponds to secondary windings 7S1 and 9S1; control windings 11C1 and 11C2 encircle legs 11CL1 and 11CL2, respectively, thus corresponding to the control windings of T2 and T3; and choke windings 11CK1 and 11CK2 encircle legs 11C1 and 11C2. Considered together, and connected in series, these windings collectively correspond to choke winding 7CK or 9CK.

When transformer T4 is to be incorporated in the welding system of FIG. 5, the windings thereof are connected in the disclosed circuit arrangement as described for the other transformers, except that the separated choke windings 11CK1 and 11CK2 are serially related, about as shown in FIG. 13, which shows the control legs and the control and choke windings of transformer T4 in circuit diagram, with terminals 1128 to 1130 corresponding respectively to terminals 28 to 30 of FIG. 5. It will be observed that windings 11C1 and 11C2 are oppositely connected in series between direct-current supply terminals 1126 and 1127 to induce direct-current flux downwardly in 11CL1 and upwardly in 11CL2. It will be observed further that each of the windings 11CK1 and 11CK2 comprises two sections. The upper and lower sections are connected in series between terminals 1128 and 1129 to give in each case the effect of a single winding section encircling legs 11CL1 and 11CL2 in common. It should be noted that two separate windings 11CK1 and 11CK2 are used at transformer T4 and connected as shown in FIG. 13 as a matter of convenience, whereas a generally equivalent single winding could be employed encircling legs 11CL1 and 11CL2 with the return loop on one side passing around leg 11P1 to avoid encircling that leg with the choke winding.

*Useful modification of T2 and T3*

A useful modification of transformer T2 of FIGS. 7 and 8 and of T3 of FIGS. 9 and 10 results from placing the principal secondary winding S1 of either transformer on the return leg RL rather than around the primary and control legs in common as shown. Referring for example to T2 of FIGS. 7 and 8, if desired, winding 7S1 may be replaced by a principal secondary winding surrounding leg 7RL rather than surrounding legs 7PL and 7CL1, 7CL2 in common as 7S1 does. The described control over welding current supplied by the newly located principal secondary winding (around leg RL1) should remain substantially unchanged, since, in either arrangement, the only primary-induced flux which effectively acts upon the principal secondary winding is that which returns by way of leg 7RL rather than by way of legs 7CL1, 7CL2 in parallel.

While I have described above the principles of my invention in connection with specific apparatus, it is to be clearly understood that this description is made only by way of example and not as a limitation to the scope of my invention.

I claim:
1. A welding transformer for supplying an adjustable welding current to a welding circuit, comprising:
   a magnetically interconnected core structure providing primary path means, control path means, and return path means;
   at least one primary winding encircling the primary path means;
   at least two control windings encircling the control path means and adapted for variable direct current excitation which correspondingly alters their alternating-flux reluctance;
   at least one secondary winding for supplying the welding current,
   the said at least one secondary winding being located on said core structure so as to be effectively acted upon by the primary winding-induced flux which traverses the return path means; and
   at least one choke winding in series with said secondary winding.
2. A transformer as recited in claim 1 wherein the said secondary winding encircles said primary path means and said control path means.
3. A transformer as recited in claim 1 wherein another secondary winding on said core structure is connected with means converting the induced alternating current into direct current for the said variable direct current excitation of the said control windings.
4. A transformer as recited in claim 1 wherein the said choke winding encircles said control path means.
5. A transformer as recited in claim 4 wherein said choke winding is tapped to render it variable as to the effective number of turns thereof.
6. A transformer as recited in claim 1 wherein said core structure comprises a primary leg, at least two control legs, and a return leg.
7. A transformer as recited in claim 6 wherein the said control legs are four in number and are arranged two by two lengthwise and crosswise in a row in which the said primary and return legs are located.
8. A transformer as recited in claim 6 wherein said core structure comprises the said legs arranged in a row.
9. A transformer as recited in claim 6 wherein said core structure comprises a first return leg, at least one control leg, a primary leg, at least one other control leg, and a second return leg arranged in a row.
10. A transformer as recited in claim 9 wherein separate choke windings in series surround the said control legs respectively.

References Cited in the file of this patent
UNITED STATES PATENTS

| | | |
|---|---|---|
| 1,810,251 | Musto | June 16, 1931 |
| 2,060,477 | Unger | Nov. 10, 1936 |
| 2,464,679 | Fletcher et al. | Mar. 15, 1949 |
| 2,535,154 | Oestreicher | Dec. 26, 1950 |
| 2,591,582 | Monette | Apr. 1, 1952 |
| 2,735,989 | Williams | Feb. 21, 1956 |
| 2,760,145 | Dunn | Aug. 21, 1956 |
| 2,792,556 | Oglesbee | May 14, 1957 |